United States Patent [19]

Wood

[11] Patent Number: 4,834,404
[45] Date of Patent: May 30, 1989

[54] SHOPPING CART HAVING AN INFANT CARRIER AND AN INFANT CARRIER THEREFOR

[76] Inventor: Jerry Wood, 1713 Seifert Cir., Charlotte, N.C. 28205

[21] Appl. No.: 230,903

[22] Filed: Aug. 11, 1988

[51] Int. Cl.$^4$ .............................................. B62B 39/00
[52] U.S. Cl. .................................. 280/33.993; 297/250
[58] Field of Search ................. 280/33.99 A, 33.99 B, 280/33.99 R; 297/229, 250, 377; 5/94; 224/158

[56] References Cited

U.S. PATENT DOCUMENTS

| | | | |
|---|---|---|---|
| 3,351,380 | 11/1967 | Sprague | 297/377 |
| 4,324,430 | 4/1987 | Dimas et al. | 297/250 |
| 4,598,945 | 7/1986 | Hopkins | 280/250 |
| 4,666,207 | 5/1987 | Quartano | 297/229 |

Primary Examiner—Charles A. Marmor
Assistant Examiner—Richard Camby
Attorney, Agent, or Firm—Charles G. Lamb

[57] ABSTRACT

An infant carrier for attachment to a shopping cart includes an infant seat structure having a seat back and a seat bottom. The seat structure is to be disposed transversely across the shopping cart basket. Brackets are provided at the seat bottom for attaching the seat directly to the top edges of the two longitudinal sides of the shopping cart basket.

6 Claims, 1 Drawing Sheet

SHOPPING CART HAVING AN INFANT CARRIER AND AN INFANT CARRIER THEREFOR

BACKGROUND OF THE INVENTION

The invention relates to infant carriers and more particularly to infant seats for use with conventional shopping carts.

Conventional shopping carts are typically equipped with a foldable structure including a pivotable frame which is pivotable from a folded position overlaying the back transverse end of the shopping cart basket to an unfolded position inwardly of the cart basket at an acute angle to the basket back end, and a pivotable shelf which is pivotable from a folded position overlaying the back transverse end of the shopping cart basket to an unfolded horizontal position extending between the basket back end and the unfolded frame. The foldable structure can function either as a compartment within the cart basket for holding small or fragile goods, or as a child's seat. A drawback of this foldable structure, when used as a child's seat, however, is that it forms a relatively upright seat which does not properly support an infant who has yet to develop strong enough muscles and muscle control to sit upright. In addition, these foldable structures are hard and uncomfortable for the infant seated therein.

There have been various proposals known to me which include fastening an infant seat to the basket of a shopping cart. In these proposals, however, the infant seat is positioned longitudinally of the shopping cart basket over the foldable structure discussed above, and is fastened to the push handle of the cart and to the pivoted frame of the foldable structure. Moreover, the infant seat either extends well over the top opening of the cart basket, thus, interfering with a clear access into the cart basket, or it extends well over the push handle of the shopping cart thereby interfering with the arms and handle of the person pushing the shopping cart. Additionally, the various proposals known to me for fastening an infant seat to a shopping cart are complicated in construction making them expensive to manufacture and difficult to use.

The present invention recognizes these drawbacks and provides a straight forward solution.

SUMMARY OF THE INVENTION

In one embodiment, the present invention provides an infant carrier for attachment to a shopping cart comprising a seat having a seat back and a seat bottom, the seat to be disposed transversely across the shopping cart basket, and bracket means on the seat bottom for attaching the seat to the top edges of the two longitudinal sides of the shopping cart basket.

In another embodiment, the present invention provides a shopping cart comprising a basket for containing goods including upstanding longitudinal sides and upstanding transverse end, an infant seat having a seat back and seat bottom disposed transversely across the basket, and brackets on the bottom for attaching the seat to the top edges of the longitudinal sides of the basket.

BRIEF DESCRIPTION OF THE DRAWINGS

A better understanding of the present invention will be had upon reference to the following description in conjunction with the accompanying drawings in which the numerals refer to like parts throughout and wherein.

DETAILED DESCRIPTION OF THE PREFERRED EMBODIMENT

Figure 1:
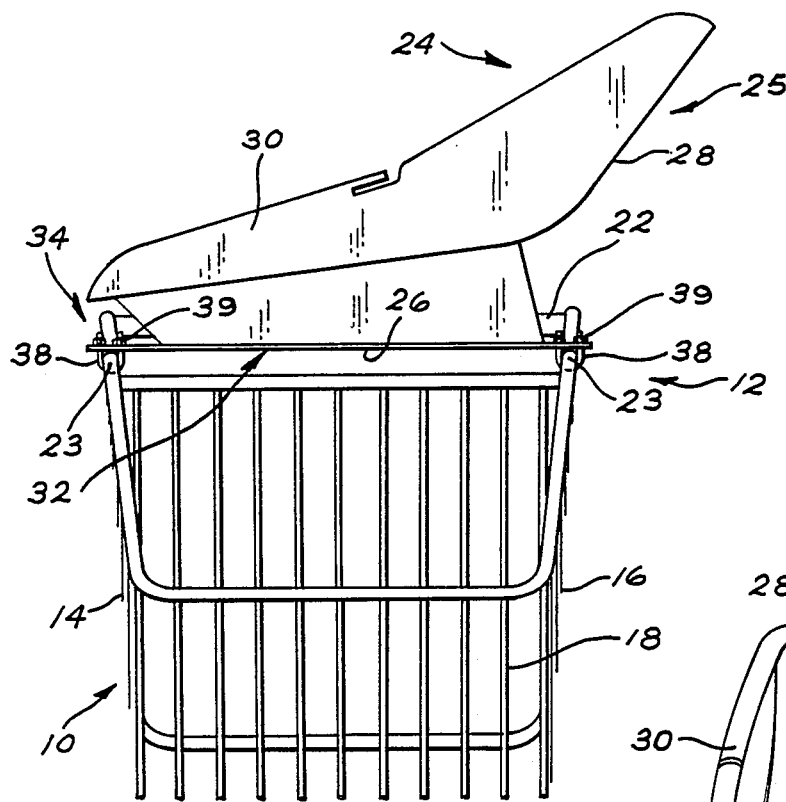
FIG. 1 is a front view of a portion of a shopping cart having an infant carrier.
Figure 2:
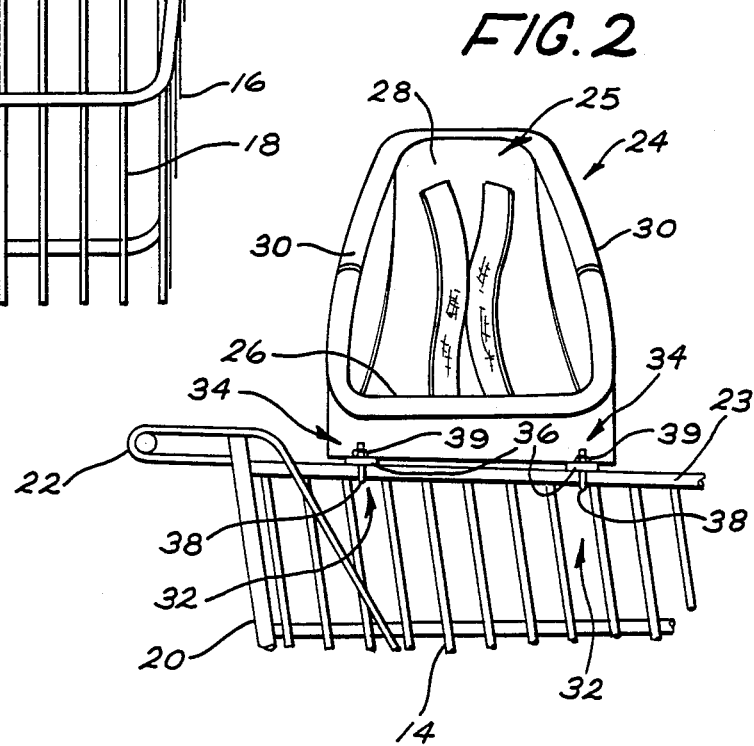
FIG. 2 is a side view of the portion of the shopping cart having the infant carrier of FIG. 1; and, FIG. 3 is a bottom view of the infant carrier of FIGS. 1 and 2.

With reference to FIGS. 1 and 2, there is shown a portion of the basket 10 of a conventional shopping cart 12 for holding goods such as groceries and the like. The shopping cart basket 10 includes two upstanding spaced apart longitudinal sides 14 and 16, and two upstanding spaced apart transverse ends 18 and 20. The transverse end 20 is shown as being the back of the basket 10. The shopping cart 12 further includes a cart push handle 22 which extends in parallel spaced apart relationship to the cart back 20. Typically, the cart sides 14 and 16, and cart ends 18 and 20 are fabricated of crossed wires forming an open work with a heavier gage wire extending around the perimeter of the basket 10 forming the top edges 23 of the sides and ends while providing structural rigidity thereto.

Figure 3:
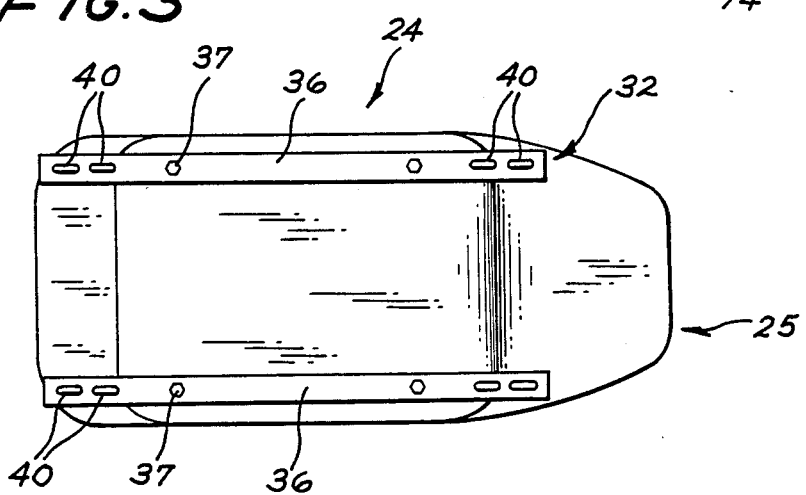

With continued reference to FIGS. 1 and 2, and additional reference to FIG. 3, there is also shown an infant carrier, generally denoted as the numeral 24, which includes a seat 25 having a seat bottom 26, a seat back 28 at one end of the seat bottom 26, and two spaced apart side walls 30 each descending from proximately the top end of the seat back 28 to the front end of the seat bottom 26. The infant carrier 24 also includes bracket means, generally denoted as the numeral 32, attached to the seat bottom 26 of the infant seat 25 and to the top edges 23 of the two longitudinal sides 14 and 16 of the shopping cart basket 10.

As can be best seen in FIGS. 1 and 2, when the infant carrier 24 is attached to the shopping cart 12 by bracket means 32, the infant seat 25 is disposed transversely across the width of the shopping cart basket 10. The bracket means 32 engage the top edges 23 of the longitudinal sides 14 and 16 of the shopping cart basket 10 thereby supporting the seat 25 directly on the longitudinal sides 14 and 16 of the shopping cart basket 10. As can be seen in FIGS. 2 and 3, the bracket means 32 projects forwardly beyond the seat bottom 2 and also projects rearwardly beyond the seat bottom 26. The bracket means 32 includes clamp means, generally denoted as the numeral 34, for fastening the bracket means 32 to the top edge 23 of the longitudinal sides 14 and 16 of the cart basket 10. The position of the clamp means 34, as shown, are adjustable along the extending o projecting portions of the bracket means 32 to enable the infant carrier to be fitted on shopping cart baskets 10 of different widths. As shown, the bracket means 32 includes a pair of parallel spaced apart longitudinally extending elongated rigid brackets 36 attached to the bottom surface of the seat bottom 26 by bolts 37. The overall length of each bracket 36 is slightly more than the width of the widest shopping cart basket 10 to which the infant carrier 24 would be mounted. It is contemplated that various different clamp means 34 can be used, however, the clamp means 34 should securely anchor the infant carrier 24 to the shopping cart 12 so that it can not be jarred loose from the shopping cart basket 10 during use One such clamping means 34 comprises a U-shaped fastener 38, such as a U-bolt.

Each of the brackets 36 have at least one pair of holes 40 formed through its outwardly projection portions. The holes 40 are spaced apart from each other in the longitudinal direction of the elongated bracket 36. Each leg of a U-shaped fastener 38 is received in a different one of the holes 40 of a pair of holes in each outwardly projecting portion of the elongated bracket 36. The at least one pair of holes 40 may comprise a series of more than two holes spaced apart along the bracket 36 so that the location of the U-shaped fastener 38 along the length of the elongated bracket 36 can be changed by inserting the legs of the U-shaped fastener 38 in different ones of the holes 40 at different distances from the ends of the bracket 36 thereby adjusting the location of the U-shaped fasteners 38 on the elongated member 36 to accommodate shopping cart baskets 10 of different widths.

As shown best in FIG. 3, however, the holes 40 are elongated slots having there major axes extending longitudinally of the bracket 36 and in mutual alignment so that the location of the U-shaped fasteners 38 can be changed by sliding the legs of the U-shaped fasteners 38 along the major axes of the slotted holes 40. As shown in FIGS. 1 and 2, the ends of the legs of the U-shaped fasteners 38 can be formed with machine threads so that the U-shaped fasteners 38 can be secured to the bracket 36 by threading appropriate nuts 39 onto the legs.

The infant carrier 24 is positioned over the opening into the shopping cart basket 10 with the seat 25 disposed transversely across the shopping cart basket 10 with the elongated bracket 36 spanning the width of the shopping cart basket 10 and projecting end portions of the elongated bracket 36 engaging the top edge 23 of the longitudinal sides 14 and 16 of the shopping cart basket 10. The clamp means 34 are then secured to the top edge 23 of the longitudinal sides 14 and 16. As shown, the clamp means 34 being U-shaped fasteners 38, these U-shaped fasteners are each located to receive the heavy gage perimeter wire constituting the top edge 23 sides of an open work shopping basket 10 between the legs of the U-shaped fastener 38. Thusly, the top edge 23 is securely anchored between the U-shaped fastener 38 and the surface of the elongated brackets 36 engaged with the basket top edge 23.

The present invention provides a number of advantages over the prior art infant carriers known to me. The infant carrier of the present invention is more straightforward and simpler to install to a shopping cart basket. In addition, unlike the prior infant carriers, the present invention provides for mounting to a shopping cart basket 10 at virtually any location between the transversely disposed front end 18 and the transversely disposed back 20 of the shopping cart basket 10. This feature allows the positioning of the infant carrier so it will not cover the foldable structure, mentioned in the background of the invention which is usable for holding small packages or fragile goods. Even further, as can be best seen in FIG. 2, the infant carrier of the present invention does not interfere in any way with the shopping cart handle 22 nor the hands and arms of a person pushing the shopping cart. Still further, the infant carrier of the present invention covers a minimum of space over the open top of the shopping cart basket because it is transversely mounted to the shopping cart basket.

The foregoing detailed description is given primarily for clearness of understanding and no unnecessary limitations are to be understood therefrom for modifications will become obvious to those skilled in the art upon reading this disclosure and may be made without departing from the spirit of the invention or scope of the appended claims.

What is claimed is:

1. An infant carrier for attachment to a shopping cart comprising:
    a seat having a back and a bottom, the seat to be disposed transversely across a shopping cart basket;
    a pair of parallel spaced apart elongated brackets attached to the bottom of the seat for attaching the seat to the top edges of the two longitudinal sides of the shopping cart basket, wherein the brackets engage the top edges of the longitudinal sides of the shopping cart basket for supporting the seat directly on the longitudinal sides of the shopping cart basket, the pair of brackets projecting outwardly from the forward end of the bottom and projecting outwardly from the rearward end of the bottom; and,
    clamp means located proximate the distal ends of each of the brackets.

2. The infant carrier of claim 1, wherein the clamp means comprises means for adjusting the location of the clamp means along the bracket means.

3. The infant carrier of claim 1, wherein the clamp means comprise:
    means defining at least one pair of holes in the projecting portions of each bracket spaces apart from each other in the longitudinal direction of the elongated bracket; and,
    a U-shaped fastener having each leg received in a different one of the holes of the at least one pair of holes in the elongated bracket.

4. The infant carrier of claim 3, wherein the holes are defined as elongated slots having their major axes extending longitudinally of the elongated brackets and in mutual alignment.

5. A shopping cart comprising:
    a basket for containing goods including upstanding longitudinal sides and upstanding transverse ends;
    an infant seat having a seat back and a seat bottom disposed transversely across the basket;
    a pair of parallel spaced apart elongated brackets attaching the seat bottom to the top edges of the longitudinal sides of the basket and resting on the top edges of the longitudinal side walls of the basket supporting the infant seat directly on the top edges of the longitudinal side walls of the basket, the pair of brackets projecting outwardly from the forward end of the seat bottom of the infant seat and projecting outwardly from the rearward end of the seat bottom engaging the top edge of the other one of the longitudinal sides of the basket; and,
    clamp means fastened to the top edge of the longitudinal sides of the basket, and the clamp means are associated with the projecting portions of the elongated brackets.

6. The shopping cart of claim 5, wherein the claim means comprise:
    means defining at least one pair of holes in the projection portion of each of the elongated brackets spaced apart from each other in the longitudinal direction of the elongated bracket; and,
    a U-shaped fastener having each leg received in a different one of the holes of the at least one pair of holes in the elongated bracket and encompassing the top edge of the elongated side of the basket.

* * * * *